Aug. 28, 1951 O. JACOBSEN 2,565,609
AUTOMATIC LUBRICATED PLUG VALVE
Filed Feb. 26, 1945 4 Sheets-Sheet 1
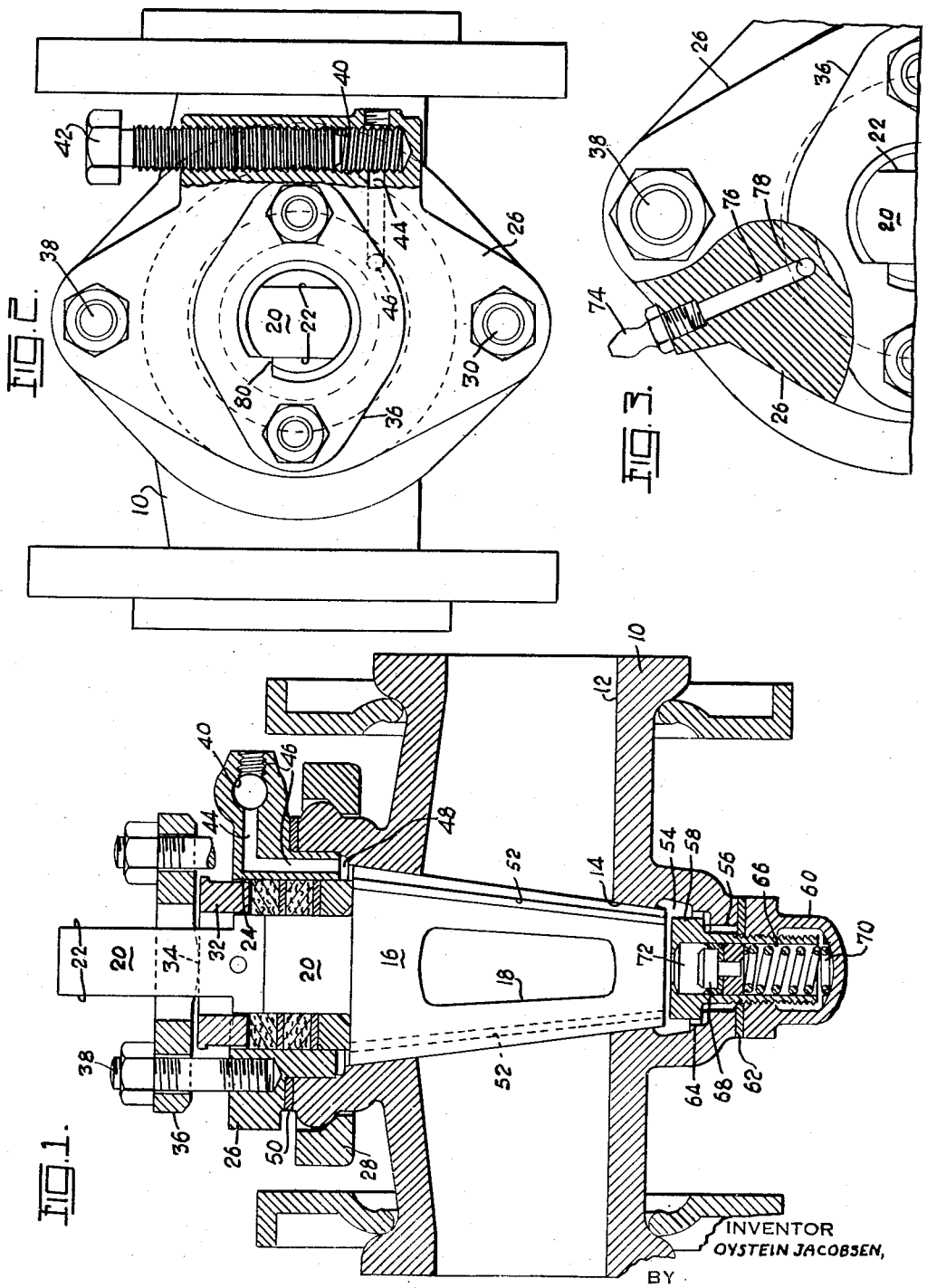
INVENTOR
OYSTEIN JACOBSEN,
BY
Toulmin + Toulmin
ATTORNEYS

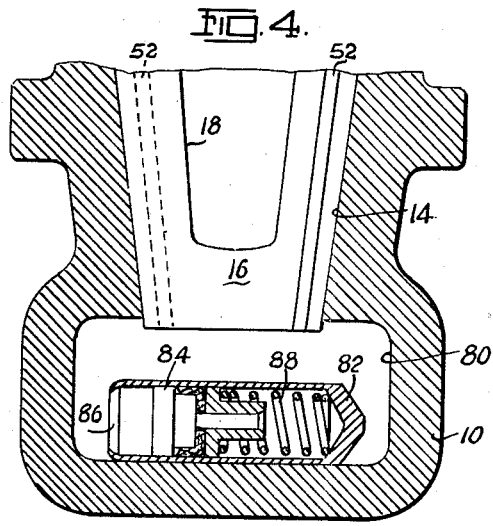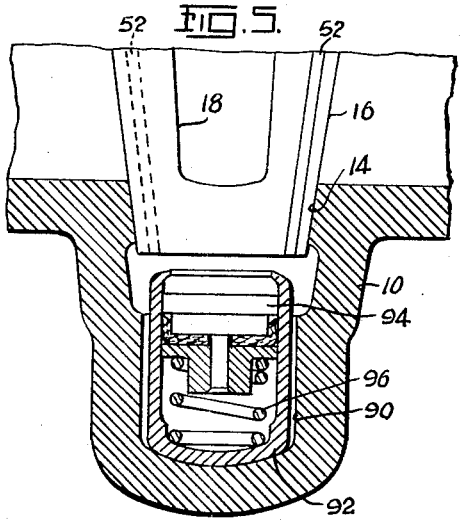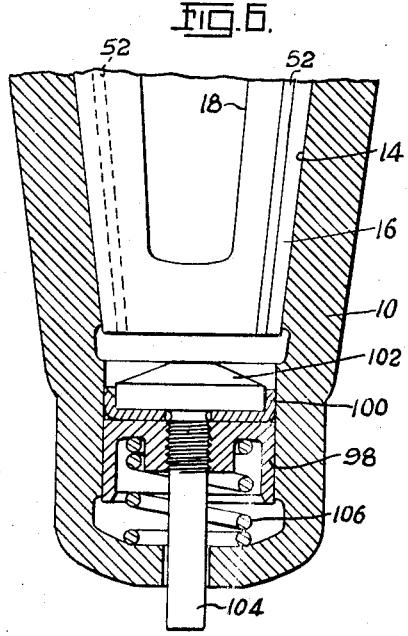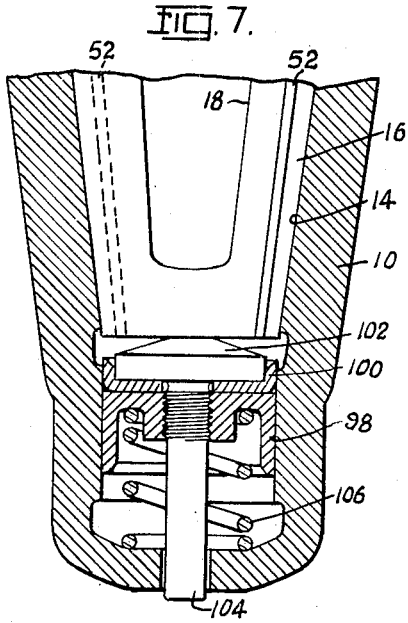

Aug. 28, 1951
O. JACOBSEN
2,565,609
AUTOMATIC LUBRICATED PLUG VALVE
Filed Feb. 26, 1945
4 Sheets-Sheet 3
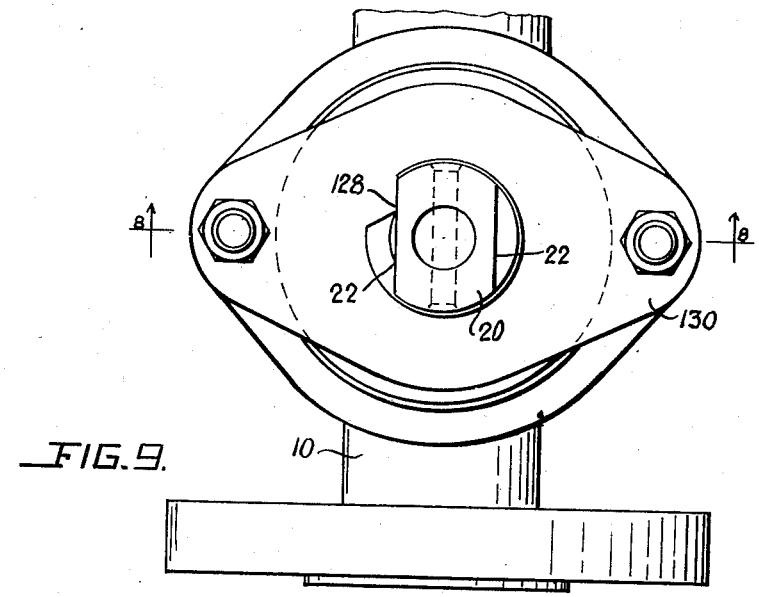
FIG. 9.
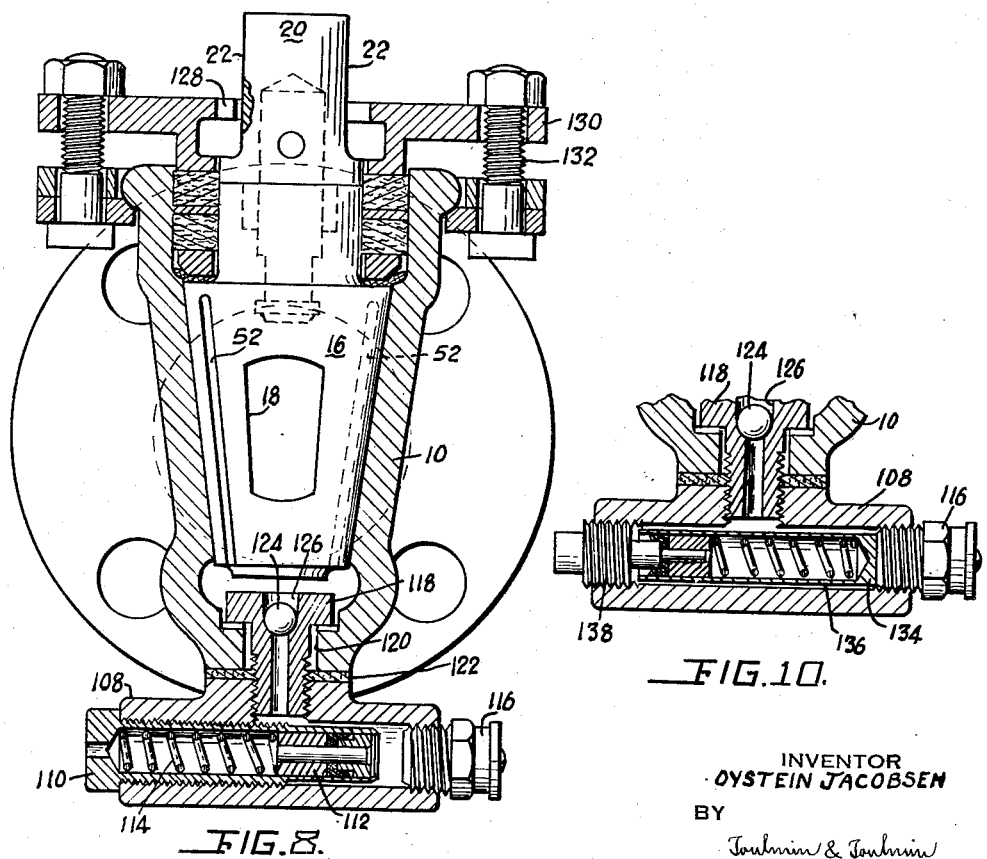
FIG. 8.
FIG. 10.
INVENTOR
OYSTEIN JACOBSEN
BY
Toulmin & Toulmin
ATTORNEYS Aug. 28, 1951  O. JACOBSEN  2,565,609
AUTOMATIC LUBRICATED PLUG VALVE
Filed Feb. 26, 1945  4 Sheets-Sheet 4

INVENTOR
OYSTEIN JACOBSEN
BY
Toulmin & Toulmin
ATTORNEYS

Patented Aug. 28, 1951

2,565,609

UNITED STATES PATENT OFFICE 2,565,609

AUTOMATIC LUBRICATED PLUG VALVE

Oystein Jacobsen, Montgomery County, Ohio, assignor to The Duriron Company, Inc., Dayton, Ohio, a corporation of New York Application February 26, 1945, Serial No. 579,743

3 Claims. (Cl. 251—93)

This invention relates to plug cock valves and, particularly, to valves of that type which have associated therewith lubricating means. More particularly still, this invention concerns detachable lubricant chambers for continuously supplying lubricant to a plug type valve.

In plug type valves the plug is generally tapered and fits within a tapered recess in the valve body so that a good seal is had between the said plug and body for preventing the leakage of the controlled fluid.

A close fitting taper of the type mentioned is subject to sticking and seizure especially if the plug remains in one position for a long period of time. Also, such valves are commonly used for handling corrosive fluids or for fluids which may deposit a sediment within the valve body which inhibits the rotation of the valve plug.

Accordingly, it is desirable to maintain the contiguous surface of the valve plug and body in a smooth, close fitting and substantially friction free relationship. I have found that this is best accomplished by supplying lubricant to the said surface through grooves in the valve plug which communicate with lubricant reservoirs located in the lower portion of the valve body or in the cap plate on the top of the valve body or a combination thereof.

The lubricant is preferably supplied to the said grooves under pressure so that it thoroughly lubricates the surfaces of the plug and body as the plug is rotated.

When plug valves are employed for handling corrosive fluids the body thereof is generally formed of a substance which is highly resistant to the action of the fluid. Such materials may comprise unmachinable substances such as silicon bearing cast iron. Since such valve bodies are substantially unmachinable, it is desirable that the lubricant passageways and chambers be former either in the valve cap plate or in a fitting which is attached to the valve body by a means which does not require excessive or fine machine work to be done.

It is a primary object of the present invention to provide a lubricating means for a plug type valve in which the lubricant reservoir is a unit separate from the valve body.

It is another object to provide a lubricating chamber for a plug type valve which includes yielding means for continuously supplying lubricant to the said valve.

It is still another object to provide a lubricating means including a pressure reservoir for a plug type valve in which the escape of fluids from the valve to the lubricant chamber is prevented.

It is still another object to provide a pressure lubricant chamber for a plug type valve which includes a tell tale indicating the amount of lubricant remaining within the chamber.

It is another object to provide a lubricated valve having a cleanout passage so that the valve casing may readily be cleaned out.

It is another object to provide a lubricating mechanism for a plug type valve in which the lubricating mechanism is an entirely separate unit from the body of the valve and contains a filling means and a lubricant storage means.

These and other objects and advantages will become more apparent upon reference to the accompanying drawings, in which:

Figure 1 is a vertical section through a plug valve embodying the present invention;

Figure 2 is a plan view partially broken away of the valve of Figure 1;

Figure 3 is a plan view of a portion of a valve similar to that of Figures 1 and 2 but showing an auxiliary lubricant supplying passage;

Figures 4 and 5 are fragmentary views of a plug valve showing a self-contained lubricant pressure storage chamber within the valve body;

Figure 6 is a view similar to Figures 4 and 5 but showing a lubricant storage chamber which comprises a tell tale;

Figure 7 is a view similar to Figure 6 but showing the lubricant chamber exhausted and the tell tale in a position to be used as a plug loosener;

Figure 8 is a vertical section through a plug valve having a modified form of lubricant storage chamber attached to the bottom thereof and is indicated by the line 8—8 on Figure 9;

Figure 9 is a plan view over the valve of Figure 8;

Figure 10 is a fragmentary view showing a modified arrangement of the lubricant storage chamber of Figure 8;

Figure 11:
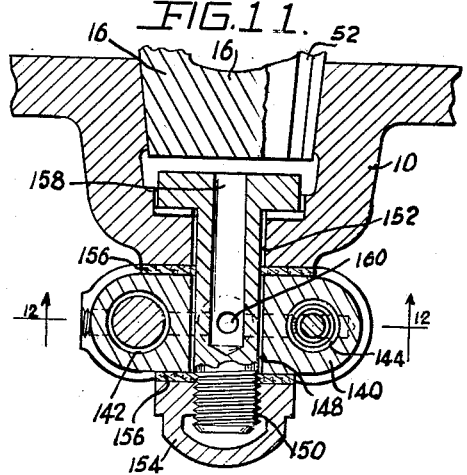
Figure 11 is a fragmentary view of the lower portion of the valve body having a modified form of lubricant chamber attached thereto and is indicated by the line 11—11 on Figure 12.

Referring to Figure 1, the valve comprises a body 10 which has a passage 12 therethrough which is intersected substantially at right angles by a conical bore 14. The conical bore 14 is adapted for receiving the conical plug 16 which has a passage 18 therethrough adapted for registration with the valve passage 12.

The plug 16 has a stem 20 thereon which terminates in the wrench flats 22 at its upper end. The stem 20 extends through packing generally indicated at 24 which is retained within a bore in the cap plate 26 which is secured to the valve body by means of a ring 28 and the bolts 30. The packing is compressed into sealing relationship with the plate 26 and stem 20 by means of a gland 32 which is urged downwardly by a protuberance 34 on the plate 36 which is secured to the plate 26 by the bolts 38.

The plate 26 comprises a horizontal bore 40 which is threaded to receive a force screw 42 which forces lubricant from the bore 40 through the hrizontal passage 44 and thence through the vertical passage 46 into the annular space 48 between the under surface of the plate 26 and the upper surface of the plug 16. A gasket 50 clamped between the plate 26 and the upper surface of the valve body 10 effectively seals against leakage of the lubricant to the outside of the valve on one side of the plate 26 while the packing 24 effectively seals on the other side of the said plate.

The plug 16 has the lubricant grooves 52 therein which communicate with the annular space 48 and also with a chamber 54 in the bottom of the valve body 10. The grooves 52 are so located on the surface of the plug that rotation of the said plug will not bring the grooves into communication with the passage 12.

The chamber 54 has an aperture 56 in the bottom thereof which receives a hollow, headed screw 58 which has the threaded portion thereof extending below the valve body and into engagement with a nut 60. A washer 62 lies between the lower surface of the body 10 and supper surface of the nut 60 in order to prevent leakage of lubricant from the valve. The lower surface of the chamber 54 may be formed into a plurality of ribs 64 which provide a passage around the head of the screw and through the aperture 56 through which dirt and used lubricant may be expelled from the valve casing when the nut 60 is removed.

The screw 58 has a bore 66 therein within which is reciprocably mounted a piston 68 which is urged toward the upper end of the bore by a spring 70 engaged by the nut 60. The bore 66 may be partially closed as at 72 in order to stop the piston 68 at a predetermined point.

Referring to Figure 3, this view illustrates a modified lubricant filling arrangement wherein the fitting 74 adapted for cooperation with a grease gun is attached to the plate 26 and communicates through a horizontal passage 76 and a vertical passage 78 with the annular chamber 48.

In order to insure that the plug 16 is not rotated beyond its full on and full off positions so that the grooves 52 are not brought into register with the passage 12, the stop lug 80 may be provided on the plate 36 so that the wrench flats 22 engage the said lug and stop the valve plug in both directions of rotation.

In operation, the force screw 42 may be removed from the bore 40 and a stick of lubricant inserted therein. Thereafter the force screw 42 is replaced in the threaded bore and threaded inwardly so that the lubricant is forced through the passages 44 and 46 into the chamber 48 and then is passed through the grooves 52 into the chamber 54. From the chamber 54 the lubricant passed into the bore 66 and moves the piston 68 downwardly against the thrust of the spring 70. When the spring 70 is compressed, a supply of lubricant for a considerable period of time is available to lubricate the contiguous surfaces of the plug and body.

Should it be desired to flush out the valve body, the nut 60 may be removed and a supply of lubricant passed through the valve either by the force screw 42 or by injecting lubricant through the fitting 74. Thereafter, the nut 60 is replaced and normal operation is resumed.

Referring to Figure 4, a modified form of lubricant chamber is shown. In Figure 4 the valve body 10 is provided with an enlarged chamber 80 at the lower end thereof which receives a cylinder 82 having reciprocably mounted therein a piston 84 which is urged toward the open end 86 of the cylinder by a spring 88. The cylinder 82 is adapted for receiving lubricant in a manner similar to the chamber shown on the valve of Figure 1 but has the additional advantage of requiring no machine work whatsoever on the valve body and no attaching screws or gaskets. The cylinder 82 is shown as partly filled with the spring 88 somewhat compressed and the piston 84 moved rightwardly from the open end 86. As in the case of the bore 66 of the screw 58, the open end 86 may be somewhat restricted in order to retain the piston 84 within the said cylinder.

In Figure 5 is illustrated another modified form of lubricant pressure chamber in which the valve body 10 has a recess 90 in the bottom thereof adapted for loosely receiving the cylinder 92 in which a piston 84 is urged upwardly by a spring 96. This chamber has the advantage of having a somewhat greater capacity than that shown in Figures 1 or 4.

Referring to Figure 6, the valve body 10 has a cylindrical recess therein which slidably receives a piston 98. The piston 98 is provided with a cup leather washer 100 and there is a central member having a head 102 and a tail rod 104. A spring 106 bears against the underneath surface of the piston and urges the same together with the portions 102 and 104 upwardly in order to displace lubricant from the recess. The tail rod 104 is adapted to serve as a tell tale indicating the amount of lubricant yet to be discharged from the recess.

Referring to Figure 7, it will be obvious that the tail rod 104 and portion 102 are also adapted to serve as a mechanical plug loosener, a light hammer blow on the lower end of the rod 104 being sufficient to break the plug loose from its seat.

In Figure 8 is illustrated a modified form of lubricant chamber attached to the lower portion of a valve body by a hollow screw which includes a check valve. The lubricant fitting comprises a body 108 which is internally threaded to receive the externally threaded force screw 110 within which is reciprocably mounted a piston 112. The piston 112 is urged rightwardly in the cylinder 110 by a compression spring 114. On the opposite end of the body 108 is attached a fitting 116 adapted to receive a grease gun so that lubricant may be injected into the interior of the body 108.

The body 108 is engaged by a screw 118 which extends through an aperture 120 in the bottom of the valve body 10. A gasket 122 provides for effectively sealing the joint between the valve body 10 and the lubricant fitting body 108.

In order to prevent the flow of fluids from the valve body into the lubricant fitting a ball check 124 is provided in the central bore 126 of the screw 118.

It will be noted that since the lubricant inlet and the lubricant pressure storage chamber are both in the fitting on the bottom of the valve, the grooves 52 need not extend to the upper edge of the plug 16 but stop somewhat short thereof.

As before, the valve stem 20 has the opposed flats 22 which engage a lug 128 on the packing gland 130 which is secured to the valve by the bolts 132.

In Figure 10 is illustrated a modification of the lubricant inlet and storage chamber 108 wherein the cylinder 134 is loosely mounted in the bore 136 of the body 108 and the left end of the said bore is closed by the screw plug 138. In the construction shown in Figure 10 lubricant is injected through the fitting 116 into the bore 136 and passes into the cylinder 134 to the left hand open end thereof.

Figure 12:
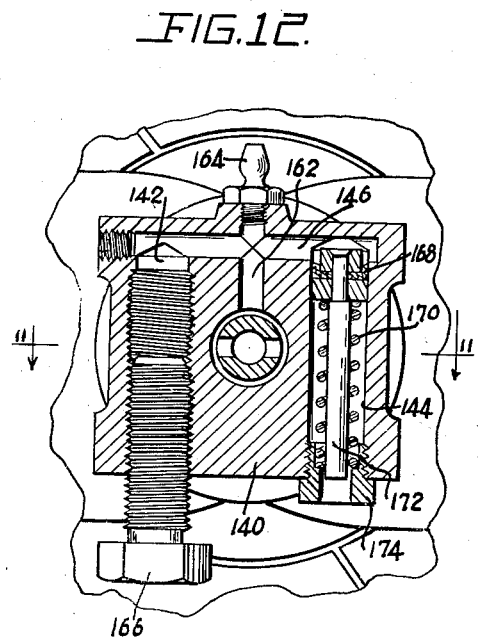
Figure 12 is a section on the line 12—12 of Figure 11 showing more in detail the lubricant chamber thereof.

Referring to Figures 11 and 12 there is shown still another modified form of lubricant receiving and pressure storage unit for attaching to the lower part of the valve body 10. The device comprises a body 140 having a pair of horizontal bores 142 and 144 therein which communicate through a passage 146. The body 140 also comprises a vertical bore 148 through which the bolt 150 passes. The bolt 150 extends through an aperture 152 in the bottom of the valve body 10 and has on its lower end a nut 154 between which and the body 10 is clamped the lubricant fitting 140. The gaskets 156 serve effectively to seal against leakage of lubricant to the outside of the fitting.

The bore 158 in the upper end of the screw 150 is intersected by a transverse bore 160 so that communication is had with the bore 148. The bore 148 in turn is connected by a passage 162 with the passage 146 and also with the lubricant fitting 164.

The bore 142 is threaded and receives the force screw 166 which is adapted for forcing stick lubricant through the passage 146 to the bore 144 where it moves the piston 168 against the thrust of the spring 170. The piston 168 comprises the tail rod 172 which extends out through the apertured plug 174 and serves as a tell tale to indicate the amount of lubricant yet to be discharged into the valve.

Figure 13:
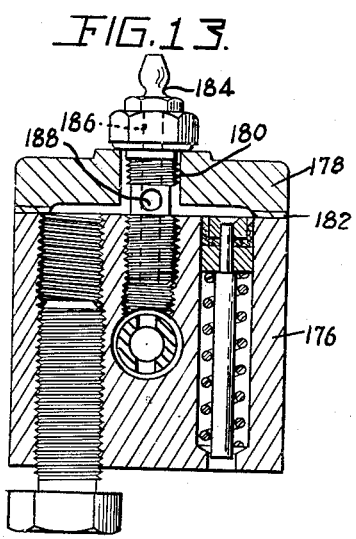
Figures 13 and 14 are views illustrating modified constructions of the lubricant chamber of Figure 12.

Figure 13 illustrates a modified arrangement wherein the lubricant body 176 is provided with an end cap 178 so that the machining of the lubricant fitting is somewhat simplified. The cap 178 may be secured to the body 176 by means of a hollow cap screw 180 and a seal effected between the cap and body by a gasket 192. The hollow cap screw has a lubricant fitting 184 secured in the head end thereof and communication is had with the various lubricant passageways through the longitudinal bore 186 and the transverse bore 188.

Figure 14:
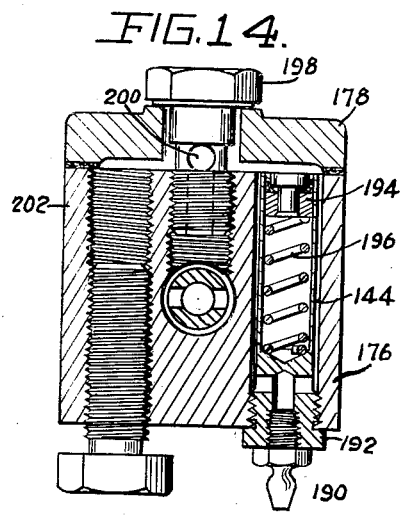

In Figure 14 is illustrated a construction similar to that shown in Figure 13 except that the lubricant fitting 190 is threaded into the plug 192 in the end of the bore 144. The plug 192 comprises a cylindrical member which reciprocably receives the piston 194 which is urged toward the open end of the said cylinder by a spring 196.

The cap 178 is secured to the body 176 by the cap screw 198 and communication is had between the various lubricant passageways by the transverse bore 200 and the longitudinal bore 202 of the said cap screw.

Figure 15:
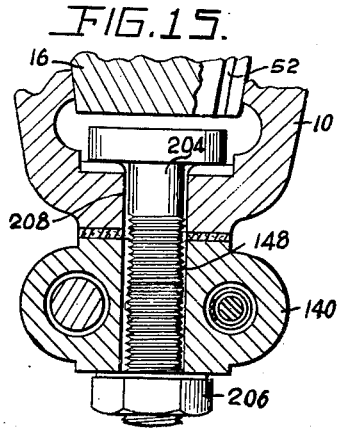
Figure 15 is a fragmentary view similar to Figure 11 but showing a modified method of attaching the chamber to the valve body.

In Figure 15 is illustrated a somewhat modified arrangement for securing the lubricant body 140 to the valve body 10. In this figure the securing means comprises the screw 204 which passes through the body 140 and is engaged by a nut 206. A clearance is provided between the screw 204 and the bore 148 and also between the upper end of the screw and the valve body 10 as at 208 so that the flow of lubricant to the valve body from the lubricant fitting is substantially unrestricted.

It will be understood that I desire to comprehend within my invention such modifications as come within the scope of the claims and the invention.

I claim:

1. A lubricated plug valve comprising a body, a plug rotatable therein, a plate for retaining said plug in position in said body, a cylinder detachably mounted in said body opposite said plate, a piston reciprocable in said cylinder, a spring for urging said piston toward one end of said cylinder, a nut adapted for engaging the other end of said cylinder for clamping the same to said body and also for closing said other end and for engaging and compressing said spring, passage means in said plug and said plate communicating with said cylinder for conveying lubricant to lubricate the contiguous surfaces of said body and plug and means in said plate for admitting a supply of lubricant into said passage means thereby to load said cylinder.

2. A lubricated plug valve comprising a body, a plug rotatable therein, a plate for retaining said plug in position in said body, a cylinder mounted in said body opposite said plate, a piston reciprocable in said cylinder, a spring for urging said piston toward one end of said cylinder, means for detachably securing said cylinder to said body, said means also closing the cylinder and engaging and compressing said spring, passage means in said plug communicating with said cylinder for conveying lubricant to lubricate the contiguous surfaces of the said body and plug, and means for admitting lubricant into the space between the plug and the piston to force the piston against said spring, said space being in communication with said lubricant-conveying passage means.

3. A lubricated plug valve comprising a body, a plug rotatable therein, a plate for retaining said plug in position in said body, a cylinder mounted in said body opposite said plate, a piston reciprocable in said cylinder, a spring for urging said piston toward one end of said cylinder, the end of the cylinder remote from said body being threaded, a hollow nut fitted over said threaded end of the cylinder and engaging the threads thereof, said nut being solid at one end for closing the cylinder and for engaging said spring, means for admitting lubricant into the space between the plug and the piston to force the piston against said spring, and passage means in said plug communicating with said space for conveying lubricant to lubricate the contiguous surfaces of said body and plug, said piston and spring serving to apply continuous pressure on the lubricant as it moves through said passage means.

OYSTEIN JACOBSEN.

(References on following page)

REFERENCES CITED

The following references are of record in the file of this patent:

UNITED STATES PATENTS

| Number | Name | Date |
|---|---|---|
| 1,400,647 | Westinghouse | Dec. 20, 1921 |
| 1,720,523 | MacGregor | July 9, 1929 |
| 1,937,122 | Leach | Nov. 28, 1933 |
| 1,942,031 | Le Duc | Jan. 2, 1934 |
| 1,944,995 | Nordstrom | Jan. 30, 1934 |
| 1,998,029 | Simpson et al. | Apr. 16, 1935 |
| 2,058,747 | Wilkins | Oct. 27, 1936 |
| 2,065,726 | Nordstrom | Dec. 29, 1936 |
| 2,070,490 | Nordstrom | Feb. 9, 1937 |
| 2,168,903 | Jacobsen | Aug. 8, 1939 |
| 2,187,926 | Aikman | Jan. 23, 1940 |
| 2,281,697 | Kerr | May 5, 1942 |
| 2,299,517 | Volpin | Oct. 20, 1942 |
| 2,300,835 | Volpin | Nov. 3, 1942 |
| 2,321,233 | Mueller | June 8, 1943 |
| 2,332,282 | Volpin | Oct. 19, 1943 |
| 2,360,599 | Volpin | Oct. 17, 1944 |
| 2,368,183 | Volpin | Jan. 30, 1945 |

FOREIGN PATENTS

| Number | Country | Date |
|---|---|---|
| 330,044 | Great Britain | June 5, 1930 |
| 499,703 | Great Britain | Jan. 27, 1939 |